(12) United States Patent
Hajati et al.

(10) Patent No.: US 11,385,463 B1
(45) Date of Patent: Jul. 12, 2022

(54) DISPLAY DEVICE USING ACTIVE SHUTTER

(71) Applicant: Apple Inc., Cupertino, CA (US)

(72) Inventors: Arman Hajati, San Mateo, CA (US); Alexander Shpunt, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 63 days.

(21) Appl. No.: 16/932,880

(22) Filed: Jul. 20, 2020

Related U.S. Application Data (60) Provisional application No. 62/901,828, filed on Sep. 18, 2019.

(51) Int. Cl.
| | |
|---|---|
| *G02B 27/01* | (2006.01) |
| *G02B 5/30* | (2006.01) |
| *H04N 9/31* | (2006.01) |
| *G02F 1/13* | (2006.01) |
| *G02B 6/35* | (2006.01) |
| *G02F 1/1335* | (2006.01) |

(52) U.S. Cl.
CPC ....... *G02B 27/0101* (2013.01); *G02B 5/3016* (2013.01); *G02F 1/13* (2013.01); *G02F 1/133528* (2013.01); *H04N 9/3141* (2013.01); *G02B 6/353* (2013.01); *G02B 2027/0118* (2013.01)

(58) Field of Classification Search
CPC .. G02B 27/0101; G02B 5/3016; G02B 6/353; G02B 2027/0118; G02F 1/13; G02F 1/133528; H04N 9/3141
See application file for complete search history.

(56) References Cited

U.S. PATENT DOCUMENTS

| | | | |
|---|---|---|---|
| 8,970,571 B1* | 3/2015 | Wong | G09G 3/3406 345/207 |
| 10,175,492 B2 | 1/2019 | Li et al. | |
| 11,067,809 B1* | 7/2021 | Sears | G02B 27/0081 |
| 2012/0038690 A1* | 2/2012 | Lee | G09G 3/003 345/691 |

(Continued)

FOREIGN PATENT DOCUMENTS

| | | |
|---|---|---|
| CA | 3018454 A1 | 5/2019 |
| CN | 108681073 A | 10/2018 |

(Continued)

*Primary Examiner* — Brent D Castiaux
(74) *Attorney, Agent, or Firm* — Kligler & Associates Patent Attorneys Ltd (57) ABSTRACT

An optical system includes a transparent display, which has a first side configured to be positioned in proximity to an eye of an observer and a second side opposite the first side, and which is configured to project an image into the eye. An image generator is configured to generate a sequence of images during respective display intervals, which are interleaved with blanking intervals, and to transmit the images to the transparent display for projection into the eye. A shutter is positioned on the second side of the display and having a first state in which the shutter blocks optical radiation and a second state in which the shutter transmits optical radiation. A controller drives the image generator and the shutter so that the shutter operates in the first state during the display intervals and in the second state during the blanking intervals.

16 Claims, 6 Drawing Sheets

(56) References Cited

U.S. PATENT DOCUMENTS

2013/0182322 A1* 7/2013 Silverstein ............. G02B 30/23
359/464
2016/0147081 A1* 5/2016 Kilcher .................... G02B 7/08
359/13
2016/0284265 A1* 9/2016 Prache .................... H01L 27/32

FOREIGN PATENT DOCUMENTS

| CN | 207946601 U | 10/2018 |
| CN | 109387942 A | 2/2019 |

* cited by examiner

DISPLAY DEVICE USING ACTIVE SHUTTER

CROSS-REFERENCE TO RELATED APPLICATION

This application claims the benefit of U.S. Provisional Patent Application 62/901,828, filed Sep. 18, 2019, which is incorporated herein by reference.

FIELD OF THE INVENTION

The present invention relates generally to optoelectronic systems, and particularly to methods and devices for augmented reality.

BACKGROUND

Augmented reality (AR) devices are used to project one or more electronically generated images directly into one or both eyes of an observer wearing the device, while permitting the observer simultaneously to view an external scene. Thus, the observer sees an electronically generated image and a scene as a visual superposition. AR is used in applications such as, for example, surgery or complicated mechanical assembly.

The AR device generates the images electronically and then projects these images into one or both eyes through, for example, an eyeglass-like device, wherein one or both of the lenses are configured to direct the images into the eyes. Simultaneously, the light from an outside scene is transmitted through the lenses into the eyes, thus generating the visual superposition of the generated image and the scene.

SUMMARY

Embodiments of the present invention that are described hereinbelow provide improved methods and systems for image projection.

There is therefore provided, in accordance with an embodiment of the invention, an optical system, including a transparent display, which has a first side configured to be positioned in proximity to an eye of an observer and a second side opposite the first side, and which is configured to project an image into the eye. An image generator is configured to generate a sequence of images during respective display intervals, which are interleaved with blanking intervals, and to transmit the images to the transparent display for projection into the eye. A shutter is positioned on the second side of the display and having a first state in which the shutter blocks optical radiation and a second state in which the shutter transmits optical radiation. A controller is coupled to drive the image generator and the shutter so that the shutter operates in the first state during the display intervals and in the second state during the blanking intervals.

In a disclosed embodiment, the shutter includes a liquid crystal (LC) device. Alternatively or additionally, the image generator includes one or more narrow-band light sources, and wherein the system includes a bandpass filter, which has one or more rejection bands at respective wavelengths of the one or more narrow-band light sources, and which is positioned adjacent to the shutter.

In some embodiments, the controller is configured to measure a level of an ambient illumination and to change a relative duration of the display intervals and the blanking intervals responsively to the level of the ambient illumination. In one embodiment, the controller is configured to increase the duration of the blanking intervals relative to the display intervals in response to a decrease in the level of the ambient illumination.

In a disclosed embodiment, the image generator includes a scanner, and the blanking intervals correspond to flyback periods of the scanner.

In embodiments of the invention, the transparent display is selected from a group of display types consisting of an internal diffracting structure, a partially reflecting structure, a waveguide including a surface relief grating, and a holographic element, including one or more of a thin volume hologram, a thick volume hologram, and a multiplexed volume hologram.

There is also provided, in accordance with an embodiment of the invention, an optical system, including first and second transparent displays, each display having a first side configured to be positioned in proximity to a respective eye of an observer and a second side opposite the first side, and each display being configured to project an image into the respective eye. First and second image generators are configured to generate respective sequences of images during respective display intervals, which are interleaved with respective blanking intervals, and to transmit the images to the first and second transparent displays respectively for projection into the respective eye. First and second shutters positioned on the second side of the first and second transparent displays, respectively, and each shutter having a first state in which the shutter blocks optical radiation and a second state in which the shutter transmits optical radiation. A controller is coupled to drive the first and second image generators and the first and second shutters so that the first shutter operates in the first state during the display intervals of the first image generator and in the second state during the blanking intervals of the first image generator, and the second shutter operates in the first state during the display intervals of the second image generator and in the second state during the blanking intervals of the second image generator.

In a disclosed embodiment, the respective sequences of display and blanking intervals of the first and second image generator are mutually shifted so that each display interval of the first image generator is temporally aligned with a corresponding blanking interval of the second image generator, and each blanking interval of the first image generator is temporally aligned with a corresponding display interval of the second image generator.

There is additionally provided, in accordance with an embodiment of the invention, a method for image projection, which includes positioning a transparent display to project an image into an eye of an observer, with a first side of the transparent display in proximity to the eye and a second side of the transparent display opposite the first side. A sequence of images are transmitted during respective display intervals, which are interleaved with blanking intervals, to the transparent display for projection into the eye. On the second side of the display, a shutter is positioned having a first state in which the shutter blocks optical radiation and a second state in which the shutter transmits optical radiation. The shutter is driven to operate in the first state during the display intervals and in the second state during the blanking intervals.

The present invention will be more fully understood from the following detailed description of the embodiments thereof, taken together with the drawings in which:

DETAILED DESCRIPTION OF EMBODIMENTS

Overview

Ideally, the projection of the electronically generated images of an AR device into one or both eyes of the observer wearing the device would take place without any leakage of the image away from the observer. In current devices, however, a portion of the image is deflected away from the observer, thus enabling another observer outside the AR device to see the image and compromising the privacy of the wearer of the AR device.

The embodiments of the present invention that are described herein address the above problem by providing an optical system that prevents the projected images from being visible to an outside observer. The optical system is based on combining an AR device with a shutter adjacent to the device, and opening and closing the shutter in synchronization with the image projection.

In the disclosed embodiments, the optical system comprises a transparent display, an image generator, a shutter, and a controller. The display and shutter may be disposed in front of one or both eyes of an observer. The image generator generates a sequence of images during display intervals, which are interleaved with blanking intervals, during which no images are generated. The generated images are transmitted to the transparent display, which projects the images into the eye through the inner side of the display, i.e. the side that is in proximity to the eye. The shutter is positioned on the opposite, outer side of the display.

The shutter has a first state in which it blocks optical radiation and a second state in which it transmits optical radiation. During the display intervals, the controller drives the shutter to operate in the first state, i.e., to block optical radiation so that the image cannot be seen from the outside of the system. During the blanking intervals, when no image is generated, the controller drives the shutter to operate in the second state, i.e., to transmit optical radiation, thus enabling the observer to see through the display and the shutter.

The synchronized operation of image generation and shutter ensures that, when the image generator generates images during the display intervals, any visible light from the images that may be projected by the transparent display away from the observer will be blocked by the shutter in the first state. During the blanking intervals, when no images are generated, the shutter is in the second (transmitting) state and permits the observer to view a scene in front of him/her. Thus, the observer sees alternatingly projected images and the scene, while no radiation from the images is observable by another observer viewing the AR device from the outside.

By alternating between the display and blanking intervals at a sufficiently high frequency, such as 50 Hz or higher, the observer will not perceive the alternating modulation of the projected images and the scene, but will rather see these two merged into one image.

In some embodiments, the optical system projects images separately into each eye. In this system, the display and blanking intervals for each eye may be in antiphase to the other eye. This feature doubles the modulation frequency perceived by the observer, which is advantageous especially when viewing moving images and scenes.

System Description

Figure 1:
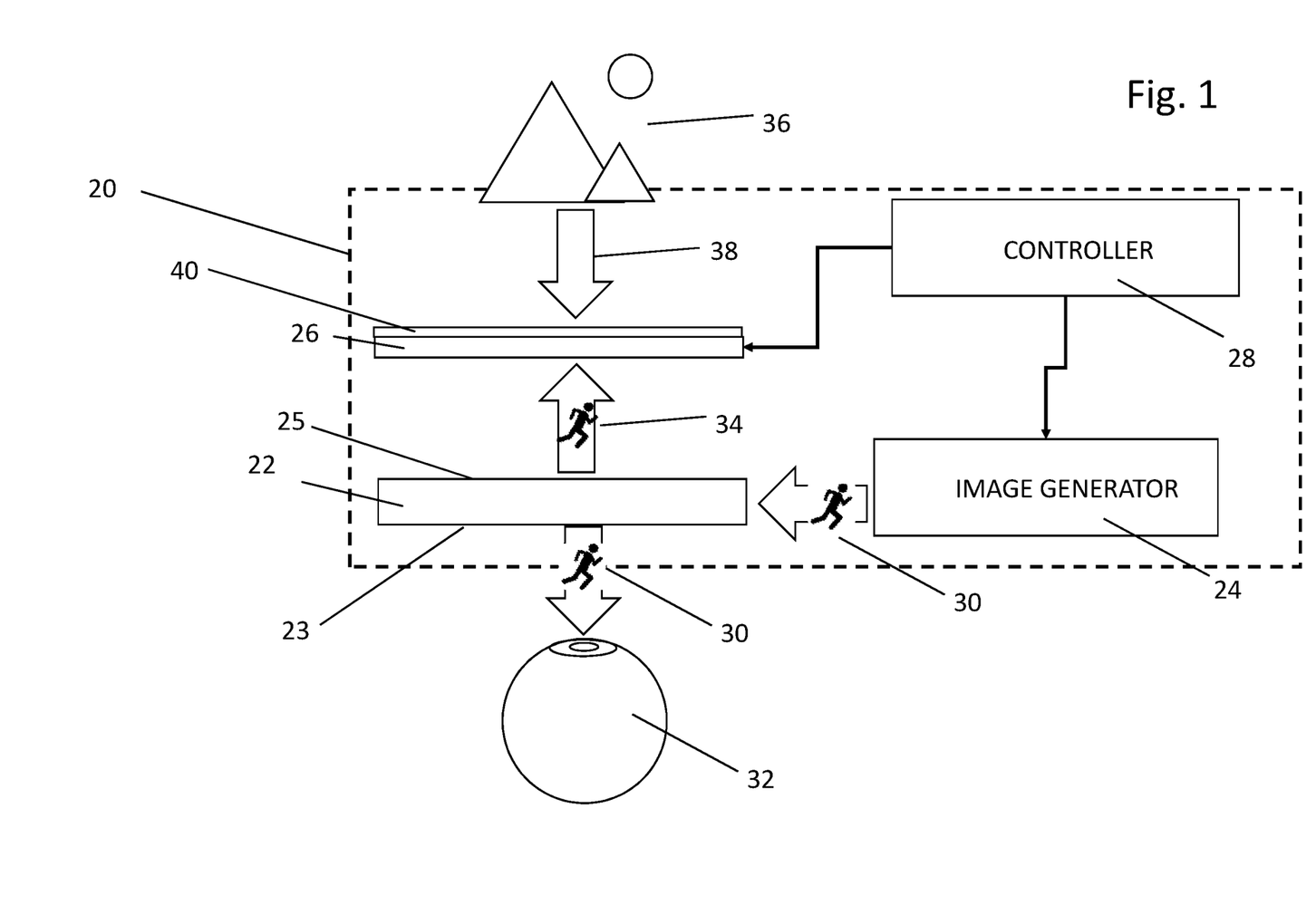
FIG. 1 is a block diagram that schematically illustrates an optical system, in accordance with an embodiment of the invention.

FIG. 1 is a block diagram that schematically illustrates an optical system 20, in accordance with an embodiment of the invention. Optical system 20 comprises a transparent display 22, an image generator 24, a shutter 26, and a controller 28.

Transparent display 22 comprises, for example, a waveguide comprising an internal diffracting or partially reflecting structure, a waveguide comprising a surface relief grating, a holographic element such as a thin or thick volume hologram, or a free-space combiner such as a multiplexed volume hologram. Transparent displays of these sorts are known in the art of AR displays, and their details are beyond the scope of the present description. An inner side 23 of display 22 is positioned in proximity to an eye 32 of an observer, while an opposite, outer side 25 of the display faces toward a scene 36. The term "transparent," as used in reference to display 22 in the context of the present description and in the claims, means that at least 30% of the visible light that is incident on outer side 25 of display 22 is transmitted through the display and exits through inner side 23. Thus, eye 32 is able to view scene 36, albeit with a reduced intensity.

Image generator 24 produces a sequence of optical images 30 by any suitable means that are known in the art, for input to display 22. Images 30 are transmitted to transparent display 22, and from there projected to eye 32 of the observer. For this purpose, image generator 24 may comprise, for example, a static array of light emitters, a scanning emitter comprising one or more light sources and a scanner, or a light source with a spatial light modulator, as well as suitable optics for transmitting the images into transparent display 22. Typically, each image in the series is displayed for a short period, referred to herein as a display interval, and the image is then refreshed during a succeeding blanking interval. (For example, when image generator 24 comprises a scanner, the blanking interval may include the flyback time of the scanner, from its final position at the end of one display interval to its initial position at the beginning of the next display interval.) Image generators of these sorts are known in the art of displays, and here, too, their details are beyond the scope of the present description.

Display 22 typically projects a leaked image 34, which is a small portion of image 30, out from the display in a direction away from eye 32. Depending on the design of display 22, the irradiance of leaked image 34 may be up to 20% of the irradiance of image 30 projected to eye 32.

To block leaked image 34, shutter 26 comprises, for example, a liquid-crystal (LC) shutter, comprising either a single LC if display 22 emits only polarized light, or crossed LCs for unpolarized light. Alternatively, shutter may comprise, for example, an electrochromic or thermochromic shutter, a suspended particle dispersion (SPD) shutter, a micro-blind shutter, a polymer-dispersed liquid crystal (PDLC) shutter, or a ferroelectric liquid crystal (FLCD)

shutter. Shutter 26 has two states: A first state (the blocking state), wherein it transmits less than 20%, or even less than 10%, of the image radiation leaked from display 22 towards the shutter, and a second state (the transmitting state), wherein it transmits at least 80%, or even 90% or 95% or more, of optical radiation from scene 36 to eye 32. When shutter 26 is in its transmitting state, optical radiation 38 from scene 36 is transmitted through the shutter and through display 22 to eye 32.

In its first (blocking) state, shutter 26 may be either absorptive or reflective. In the reflective case, leaked image 34 (or a portion of it) is reflected back toward eye 32, thus increasing the brightness and efficiency of display 22.

The efficiency of shutter 26 for blocking radiation may be increased by using passive filtering. For example, shutter 26 may comprise, besides the LC shutter, an additional bandpass filter 40. As image generators for AR applications, such as image generator 24, commonly use narrow-band red, green and blue light sources, the increase in blocking efficiency may be accomplished by using bandpass filter 40 with three rejection bands located at the wavelengths of the light sources, with the filter adjacent to the LC shutter. Alternatively, three single-band bandpass filters, with each band located at a different source wavelength, may be used in this manner. An additional increase in the blocking efficiency may be accomplished, when the images from image generator 24 comprise polarized light, by using a fixed cross-polarizing sheet adjacent to the LC shutter.

Controller 28 typically comprises a programmable processor, which is programmed in software and/or firmware to carry out the functions that are described herein. Alternatively or additionally, controller 28 comprises hard-wired and/or programmable hardware logic circuits, which carry out at least some of the functions of the controller. Controller 28 may optionally comprise a photodetector (not shown) for monitoring the levels of ambient illumination, and may then be configured to control the operation of image generator 24 and shutter 26 accordingly. Although controller 28 is shown in the figures, for the sake of simplicity, as a single, monolithic functional block, in practice the controller may comprise a single chip or a set of two or more chips, with suitable interfaces for receiving and outputting the signals that are illustrated in the figures and are described in the text.

For the use of optical system 20 as an AR device, transparent display 22 is fitted as a lens into modified eyeglass frames (not shown), and shutter 26 is positioned adjacent to outer side 25 of the display. Image generator 24, as well as controller 28 are suitably affixed to the modified eyeglass frames, so that optical system 20 may be worn by the observer.

Figure 2A:
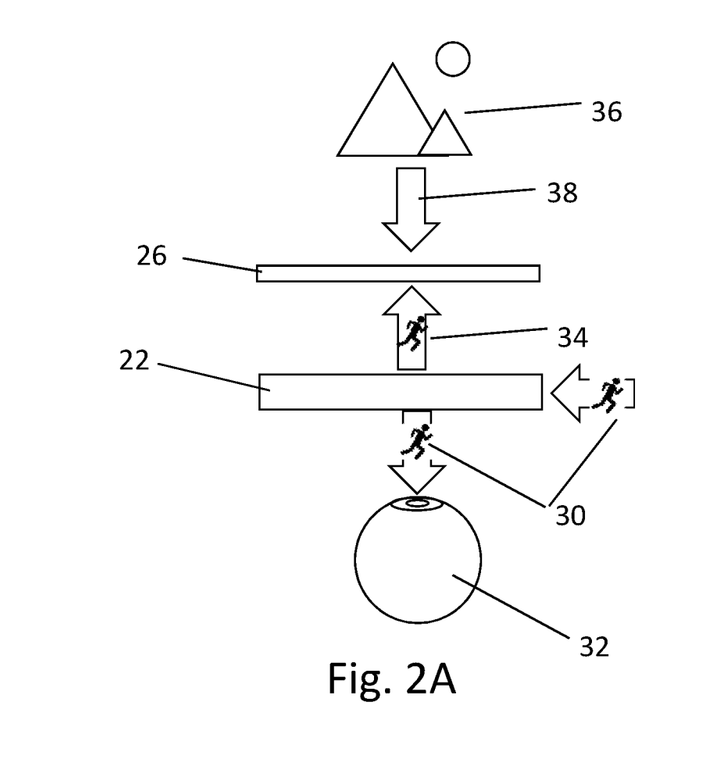
FIGS. 2A and 2B are schematic top views of the optical system of FIG. 1 in two different states of operation, in accordance with an embodiment of the invention.
Figure 2B:
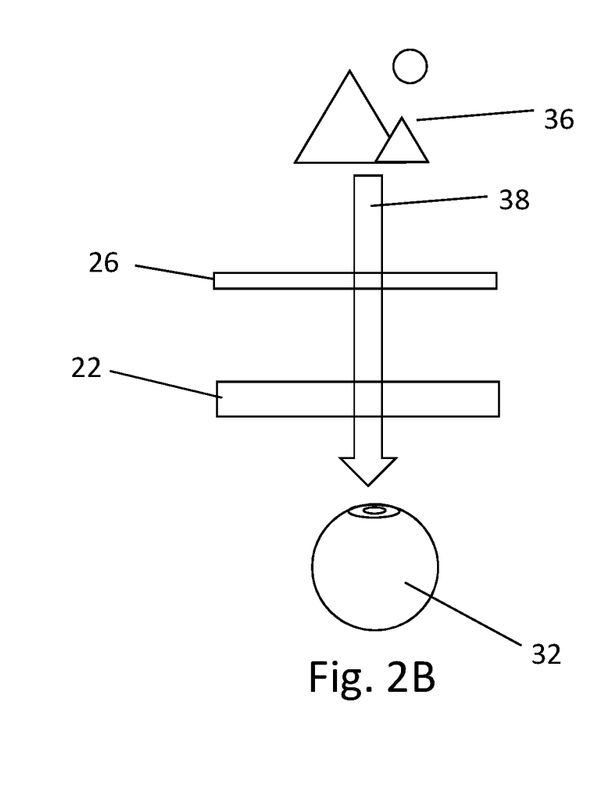

FIGS. 2A and 2B are schematic top views of optical system 20 in its two states of operation, in accordance with an embodiment of the invention. For the sake of clarity, image generator 24 and controller 28 have been omitted from the figures. The same image labels are used as in FIG. 1.

The two states of operation of optical system 20 comprise a display interval and a blanking interval of image generator 24, which repeat sequentially one after the other. FIG. 2A is a schematic illustration of optical system 20 during a display interval. During the display interval, controller 28 directs image generator 24 to send image 30 into display 22, which projects the image to eye 32. Simultaneously, controller 28 drives shutter 26 into its blocking state, as indicated symbolically by the black color of the shutter. Although some of image 30 is leaked out as leaked image 34, it is blocked by shutter 26. Optical radiation 38 from scene 36 is similarly blocked by shutter 26 from reaching eye 32.

FIG. 2B is a schematic illustration of optical system during a blanking interval. During the blanking interval, no image is sent by image generator 24, so there is no concern regarding leaked image 34. Shutter 26 is in its transmitting state, thus transmitting optical radiation 38 from scene 36 into eye 32.

The two states of optical system 20 are shown in Table 1, below.

TABLE 1

| The two states of optical system 20 | | |
|---|---|---|
| Interval | Image generator 24 | State of shutter 26 |
| Display | Sends image(s) | Blocking state |
| Blanking | Does not send image(s) | Transmitting state |

Figure 3:
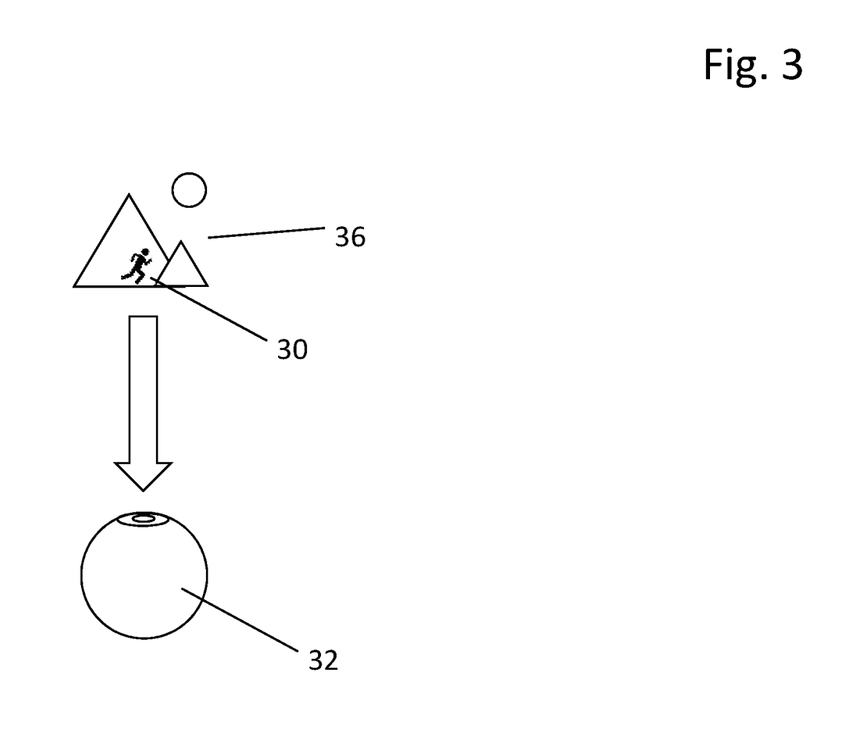
FIG. 3 is a schematic illustration of an image perceived by an observer viewing the optical system of FIG. 1, in accordance with an embodiment of the invention.

FIG. 3 is a schematic illustration of the image perceived by an observer viewing optical system 20, in accordance with an embodiment of the invention. By alternating the display and blanking intervals at a sufficiently high frequency, the observer, whose eye 32 is viewing optical system 20, will perceive image 30 merged with scene 36. For a static scene and image, a frequency of 50 Hz suffices to produce a merged image. For a dynamic scene and image, a higher frequency, such as 120 Hz, is desirable.

Figure 4:
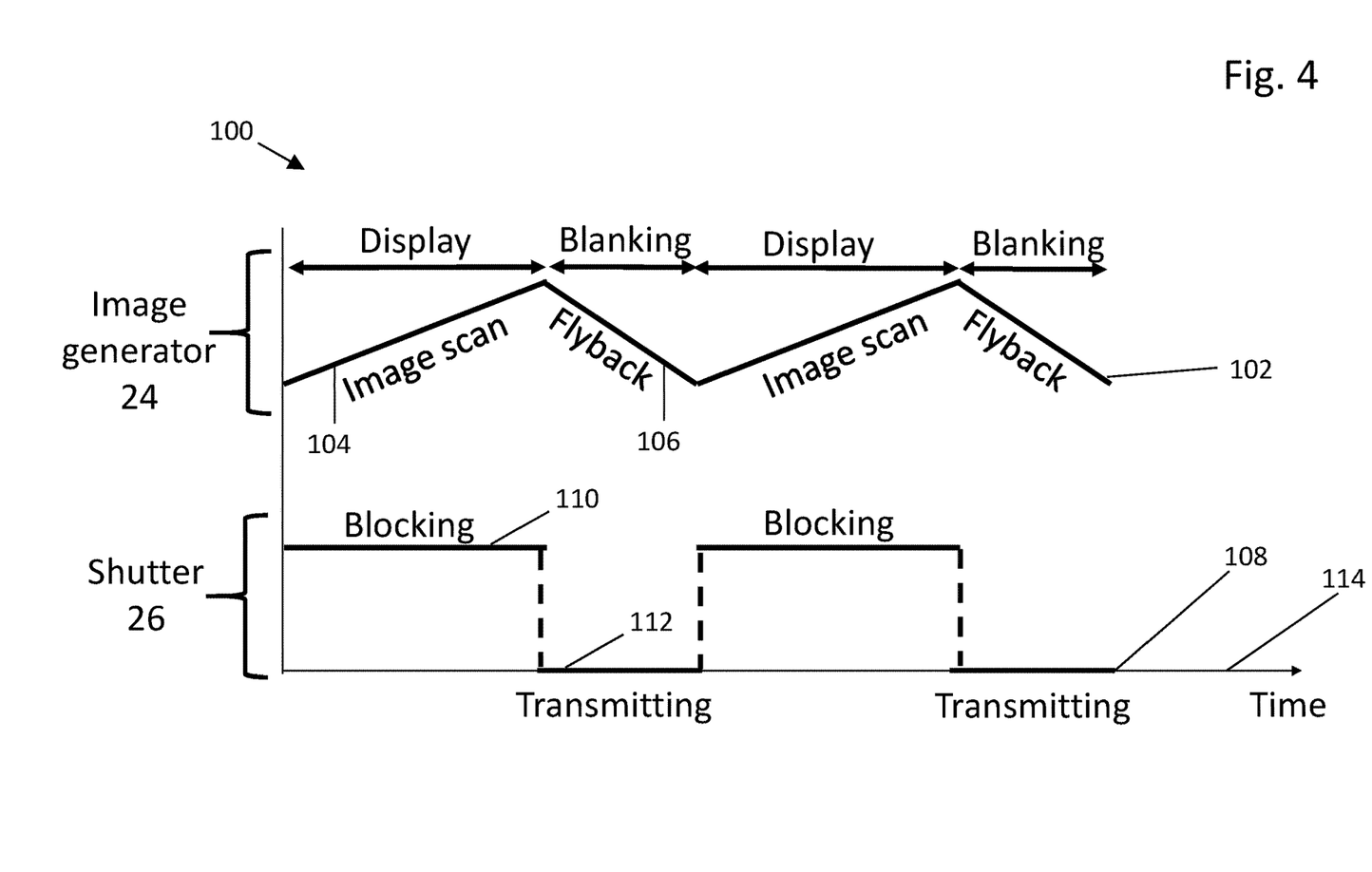
FIG. 4 is a schematic timing diagram of the optical system of FIG. 1, in accordance with an embodiment of the invention.

FIG. 4 is a schematic timing diagram 100 of optical system 20, in accordance with an embodiment of the invention. Timing diagram 100 shows the functioning of image generator 24 and shutter 26 against a temporal axis 114.

An upper curve 102 shows the functioning of image generator 24, which is assumed to be of the scanning type, wherein the image is generated in an image scan phase 104 (denoted by an ascending line), and wherein a scanner internal to the image generator (not shown) returns to its initial state in a flyback phase 106 (denoted by a descending line). In optical system 20, image scan phase 104 corresponds to the display interval, and flyback phase 106 corresponds to the blanking interval.

Curve 108 shows two states of shutter 26: a blocking state 110 (first state), and a transmitting state 112 (second state). Corresponding to the functioning of optical system 20, as shown in FIGS. 2A and 2B, blocking state 110 of shutter 26 is synchronized with image scan 104 (display interval) of image generator 24. Similarly, transmitting state 112 of shutter 26 is synchronized with flyback 106 (blanking interval) of image generator 24.

The relative durations of the display and blanking intervals of image generator 24 and the corresponding blocking and transmitting states of shutter 26 may be adjusted by controller 28, for example to account for different illumination conditions. Thus, for example, in an indoor environment, where scene 36 may be relatively dimly lit, the length of the blanking interval of image generator 24 (and transmitting state of shutter 26) may be adjusted to be longer than in an outdoor environment, where scene 36 is more brightly lit. This adjustment permits a larger fraction of the available optical radiation 38 to reach eye 32 from a dimly lit scene 36 than from a brightly lit scene.

Figure 5:
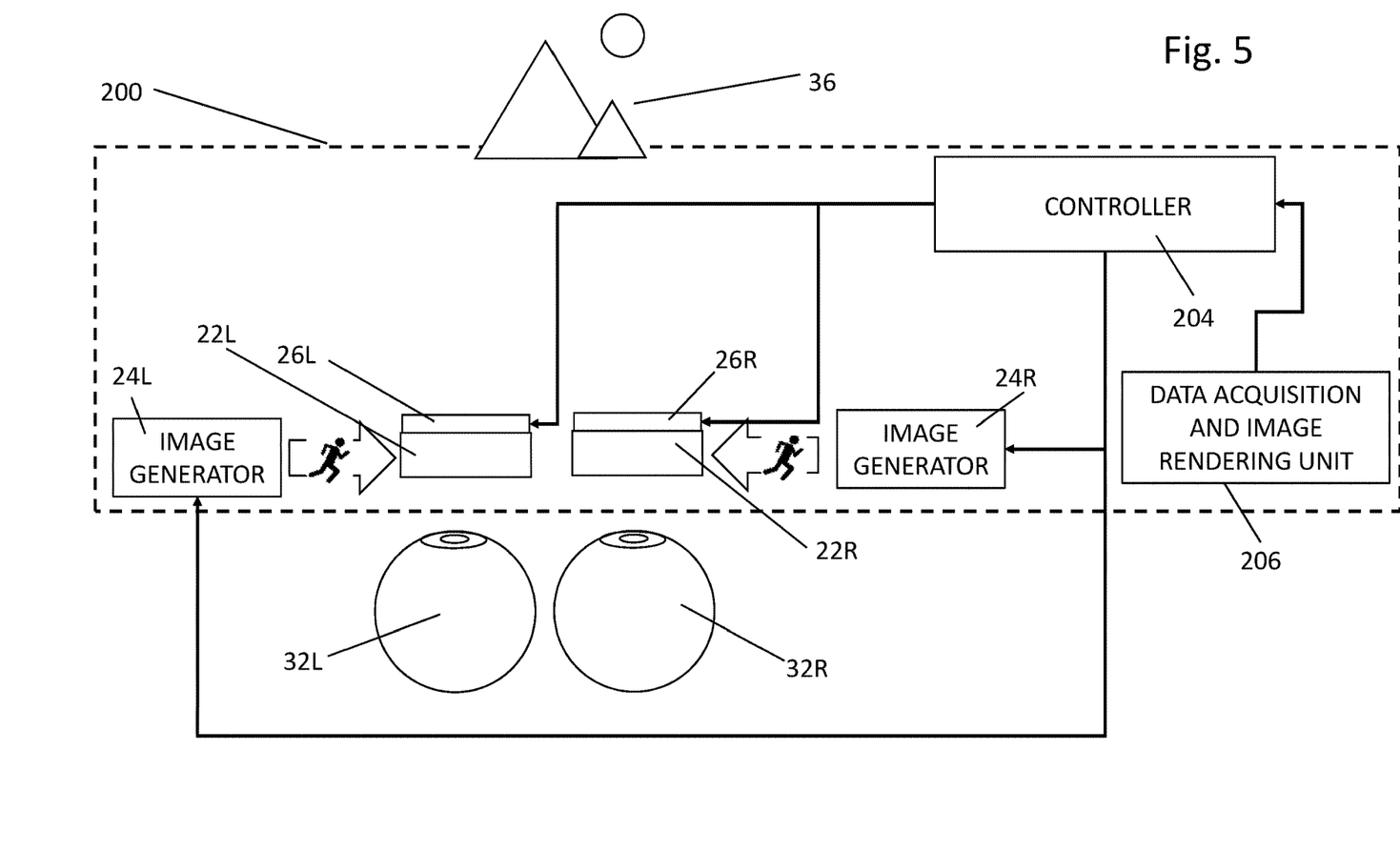
FIG. 5 is a block diagram that schematically illustrates an optical system, in accordance with another embodiment of the invention.

FIG. 5 is a block diagram that schematically illustrates an optical system 200, in accordance with another embodiment of the invention. Optical system 200 is an extension of optical system 20 for two eyes 32L and 32R, with L and R referring to left and right, respectively. Optical system 200 comprises transparent displays 22L and 22R, image generators 24L and 24R, and shutters 26L and 26R, which are similar to display 22, image generator 24, and shutter 26, respectively. Optical system 200 further comprises a controller 204, similar to controller 28 of system 20, and a data acquisition and image rendering (DAIR) unit 206, which is coupled to the controller. During the functioning of optical system 200, controller 204 both drives DAIR unit 206 and transmits data from it to right and left image generators 24R and 24L. Controller 200 further drives shutters 26L and 26R.

DAIR unit 206 comprises one or more sensors (not shown), for example cameras, inertial sensors such as accelerometers or gyroscopes, depth sensors, and/or light sensors. In addition, DAIR unit 206 comprises electronics for receiving and processing signals from its sensors and for executing a Simultaneous Localization and Mapping (SLAM) task. SLAM is responsible for position tracking and calculating the three-dimensional (3D) position of optical system 200 relative to the outside world (mapping), including scene 36. Furthermore, the electronics of DAIR 206 are configured to render still or video images based on the signals received from its sensors. Similarly to controllers 28 and 200, the electronics of DAIR unit 26 typically comprise a programmable processor, which is programmed in software and/or firmware to carry out the functions that are described herein. Alternatively or additionally, the electronics of DAIR unit 206 comprise hard-wired and/or programmable hardware logic circuits, which carry out at least some of the functions of the DAIR unit. Although DAIR unit 206 is shown in FIG. 5, for the sake of simplicity, as a single, monolithic functional block, in practice the DAIR unit may comprise a single chip or a set of two or more chips and sensors, with suitable interfaces for receiving and outputting the signals that are illustrated in the figures and are described in the text. Furthermore, although controller 200 and DAIR unit 206 are shown in FIG. 5 as two separate blocks, they may be combined to a single unit.

Figure 6:
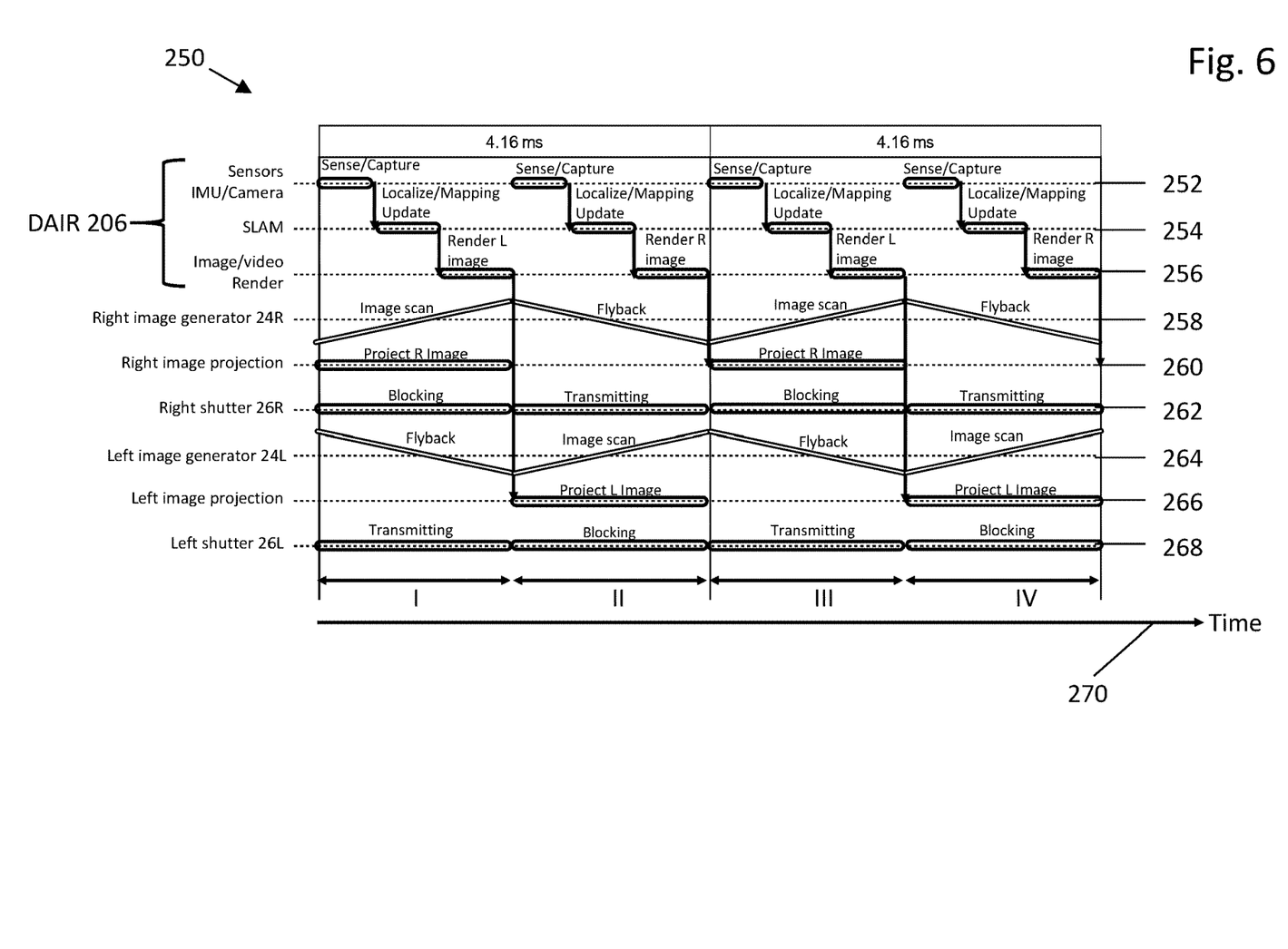
FIG. 6 is a schematic timing diagram of the optical system of FIG. 5, in accordance with an embodiment of the invention.

FIG. 6 is a schematic timing diagram 250 of optical system 200, in accordance with an embodiment of the invention. The functioning of optical system 200 is shown in timing diagram 250 by symbolic notations on nine lines 252, 254, . . . , 268 against a temporal axis 270, with the nine lines described in Table 2, below. For the sake of the following discussion, temporal axis 270 is divided into four sections I, II, III, and IV.

TABLE 2

Timing diagram 250 of optical system 200

| Line in timing diagram 250 | Unit of optical system 200 | Action |
| --- | --- | --- |
| 252 | DAIR unit 206 | Sense/capture data from DAIR sensors, IMU, and camera |
| 254 | DAIR unit 206 | SLAM - Localize optical system 200 and update mapping |
| 256 | DAIR unit 206 | Render still or video images |
| 258 | Right image generator 24R | Generate image for right eye 32R (similar to FIG. 4) |
| 260 | Right image generator 24R | Project image to right transparent display 22R |
| 262 | Right shutter 26R | Open/close right shutter 26R |

TABLE 2-continued

Timing diagram 250 of optical system 200

| Line in timing diagram 250 | Unit of optical system 200 | Action |
| --- | --- | --- |
| 264 | Left image generator 24L | Generate image for left eye 32L (similar to FIG. 4) |
| 266 | Left image generator 24L | Project image to left transparent display 22L |
| 268 | Left shutter 26L | Open/close left shutter 26L |

In section I, DAIR unit 206 senses and captures data from its sensors, including an inertial measurement unit (IMU) and camera. From these data, DAIR unit 206 performs the SLAM task of extracting the position of optical system 200 and updating its mapping, and renders still or video images accordingly. Simultaneously with these actions of DAIR unit 206, which will produce data and images to be projected to left eye 32L in the next section II, right image generator 24R scans and transmits one or more images (from the previous section) to right transparent display 22R, which in turn projects these images to right eye 32R. During section I, right shutter 26R is closed, blocking any leakage to the outside world of images projected to right eye 32R. However, left shutter 26L is open, permitting the transmission of optical radiation from scene 36 into left eye 32L.

In section II, the images generated by DAIR unit 206 during section I are used for generating images for projection to left eye 32L, as indicated above. Simultaneously, DAIR unit 206 produces data and images to be projected to right eye 32R in section III. During section II, left shutter 26L is closed, blocking any leakage to the outside world of images projected to left eye 32L. However, right shutter 26R is open, permitting the transmission of optical radiation from scene 36 into right eye 32R.

Sections III and IV repeat the respective sections I and II. A full cycle of optical system 200 thus comprises two sections of timing diagram 250, for example sections I and II. In timing diagram 250, the length of a full cycle is 4.16 milliseconds, corresponding to 240 frames per second (fps). Although the frame rate for each eye separately is 120 fps, the overall frame rate perceived by the wearer of optical system 200 is 240 fps, which is advantageous when viewing dynamically changing images and scenes.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical system, comprising:
    a transparent display, which has a first side configured to be positioned in proximity to an eye of an observer and a second side opposite the first side, and which is configured to project an image into the eye;
    an image generator, which is configured to generate a sequence of images during respective display intervals, which are interleaved with blanking intervals, and to transmit the images to the transparent display for projection into the eye, wherein the image generator includes one or more narrow-band light sources;

a shutter positioned on the second side of the display and having a first state in which the shutter blocks optical radiation and a second state in which the shutter transmits optical radiation;

a bandpass filter, which has one or more rejection bands at respective wavelengths of the one or more narrow-band light sources, and which is positioned adjacent to the shutter; and a controller coupled to drive the image generator and the shutter so that the shutter operates in the first state during the display intervals and in the second state during the blanking intervals.

2. The optical system according to claim 1, wherein the shutter comprises a liquid crystal (LC) device.

3. The optical system according to claim 1, wherein the controller is configured to measure a level of an ambient illumination and to change a relative duration of the display intervals and the blanking intervals responsively to the level of the ambient illumination.

4. The optical system according to claim 3, wherein the controller is configured to increase the duration of the blanking intervals relative to the display intervals in response to a decrease in the level of the ambient illumination.

5. The optical system according to claim 1, wherein the image generator comprises a scanner, and the blanking intervals correspond to flyback periods of the scanner.

6. The optical system according to claim 1, wherein the transparent display is selected from a group of display types consisting of an internal diffracting structure, a partially reflecting structure, a waveguide comprising a surface relief grating, and a holographic element, including one or more of a thin volume hologram, a thick volume hologram, and a multiplexed volume hologram.

7. An optical system, comprising:
first and second transparent displays, each display having a first side configured to be positioned in proximity to a respective eye of an observer and a second side opposite the first side, and each display being configured to project an image into the respective eye;

first and second image generators, which are configured to generate respective sequences of images during respective display intervals, which are interleaved with respective blanking intervals, and to transmit the images to the first and second transparent displays respectively for projection into the respective eye, wherein the image generators include one or more narrow-band light sources;

first and second shutters positioned on the second side of the first and second transparent displays, respectively, and each shutter having a first state in which the shutter blocks optical radiation and a second state in which the shutter transmits optical radiation;

first and second bandpass filters, which have one or more rejection bands at respective wavelengths of the one or more narrow-band light sources, and which are positioned adjacent to the first and second shutters; and a controller coupled to drive the first and second image generators and the first and second shutters so that the first shutter operates in the first state during the display intervals of the first image generator and in the second state during the blanking intervals of the first image generator, and the second shutter operates in the first state during the display intervals of the second image generator and in the second state during the blanking intervals of the second image generator.

8. The optical system according to claim 7, wherein the respective sequences of display and blanking intervals of the first and second image generator are mutually shifted so that each display interval of the first image generator is temporally aligned with a corresponding blanking interval of the second image generator, and each blanking interval of the first image generator is temporally aligned with a corresponding display interval of the second image generator.

9. A method for image projection, comprising:
positioning a transparent display to project an image into an eye of an observer, with a first side of the transparent display in proximity to the eye and a second side of the transparent display opposite the first side, wherein transmitting the sequence of the images comprises generating the images using one or more narrow-band light sources;

transmitting a sequence of images during respective display intervals, which are interleaved with blanking intervals, to the transparent display for projection into the eye;

positioning on the second side of the display a shutter having a first state in which the shutter blocks optical radiation and a second state in which the shutter transmits optical radiation;

positioning a bandpass filter, which has one or more rejection bands at respective wavelengths of the one or more narrow-band light sources, adjacent to the shutter; and driving the shutter to operate in the first state during the display intervals and in the second state during the blanking intervals.

10. The method according to claim 9, wherein the shutter comprises a liquid crystal (LC) device.

11. The method according to claim 9, wherein driving the image generator comprises measuring a level of an ambient illumination and changing a relative duration of the display intervals and the blanking intervals responsively to the level of the ambient illumination.

12. The method according to claim 11, wherein changing the relative duration comprises increasing the duration of the blanking intervals relative to the display intervals in response to a decrease in the level of the ambient illumination.

13. The method according to claim 9, wherein transmitting the sequence of the images comprises generating the images using a scanner, wherein the blanking intervals correspond to flyback periods of the scanner.

14. The method according to claim 9, wherein the transparent display is selected from a group of display types consisting of an internal diffracting structure, a partially reflecting structure, a waveguide comprising a surface relief grating, and a holographic element, including one or more of a thin volume hologram, a thick volume hologram, and a multiplexed volume hologram.

15. The method according to claim 9, wherein positioning the transparent display comprises positioning first and second transparent displays in proximity to left and right eyes of the observer, respectively, with each display being configured to project respective images into a respective eye, and wherein positioning the shutter comprises positioning first and second shutters on the second side of the first and second transparent displays, respectively, and wherein driving the shutter comprises driving the first and second shutters so that the first shutter operates in the first state during the display intervals of the images projected into the left eye and in the second state during the blanking intervals of the images projected into the left eye, and the second shutter operates in the first state during the display intervals of the images projected into the right eye and in the second state during the blanking intervals of the images projected into the right eye.

16. The method according to claim 15, wherein the respective sequences of display and blanking intervals of the images projected respectively into the left and right eyes are mutually shifted so that each display interval of the images projected into the left eye is temporally aligned with a corresponding blanking interval of the images projected into the right eye, and each blanking interval of the images projected into the left eye is temporally aligned with a corresponding display interval of the images projected into the right eye.

* * * * *